United States Patent [19]

Getz

[11] Patent Number: 4,653,148
[45] Date of Patent: Mar. 31, 1987

[54] APPARATUS FOR PROCESSING DEHAIRED HOGS

[75] Inventor: Donald J. Getz, Omaha, Nebr.

[73] Assignee: The Cincinnati Butchers' Supply Company, Cincinnati, Ohio

[21] Appl. No.: 820,986

[22] Filed: Jan. 21, 1986

[51] Int. Cl.⁴ .............................................. A22B 5/08
[52] U.S. Cl. .......................................... 17/20; 17/47
[58] Field of Search ............................... 17/20, 47, 51

[56] References Cited

U.S. PATENT DOCUMENTS

| | | | |
|---|---|---|---|
| 844,153 | 2/1907 | Loescher | 17/20 |
| 1,291,738 | 1/1919 | Bliss et al. | 17/20 |
| 2,978,738 | 4/1961 | Jönsson | 17/20 X |
| 3,131,035 | 4/1964 | Erickson | 34/77 |
| 4,132,011 | 1/1979 | Nichols | 34/86 |
| 4,309,795 | 1/1982 | Simonsen | 17/47 |
| 4,312,136 | 1/1982 | Bahner et al. | 34/35 |
| 4,488,362 | 12/1984 | Grassmann | 34/86 X |
| 4,501,318 | 2/1985 | Hebrank | 34/86 X |
| 4,566,151 | 1/1986 | Warren | 17/47 |

Primary Examiner—Willie G. Abercrombie
Attorney, Agent, or Firm—Lloyd L. Zickert

[57] ABSTRACT

Apparatus for processing dehaired hogs, including a predryer cabinet through which the hogs are conveyed and subjected to a blast of heated air and a singer cabinet through which the hogs next are conveyed and subjected to flame treatment for singeing the hog skin. The heat energy for the dryer air is derived solely from recovery of heat from the waste flue gases exhausted from the singer cabinet, thereby reducing the energy needed to effect the singeing operation.

1 Claim, 3 Drawing Figures

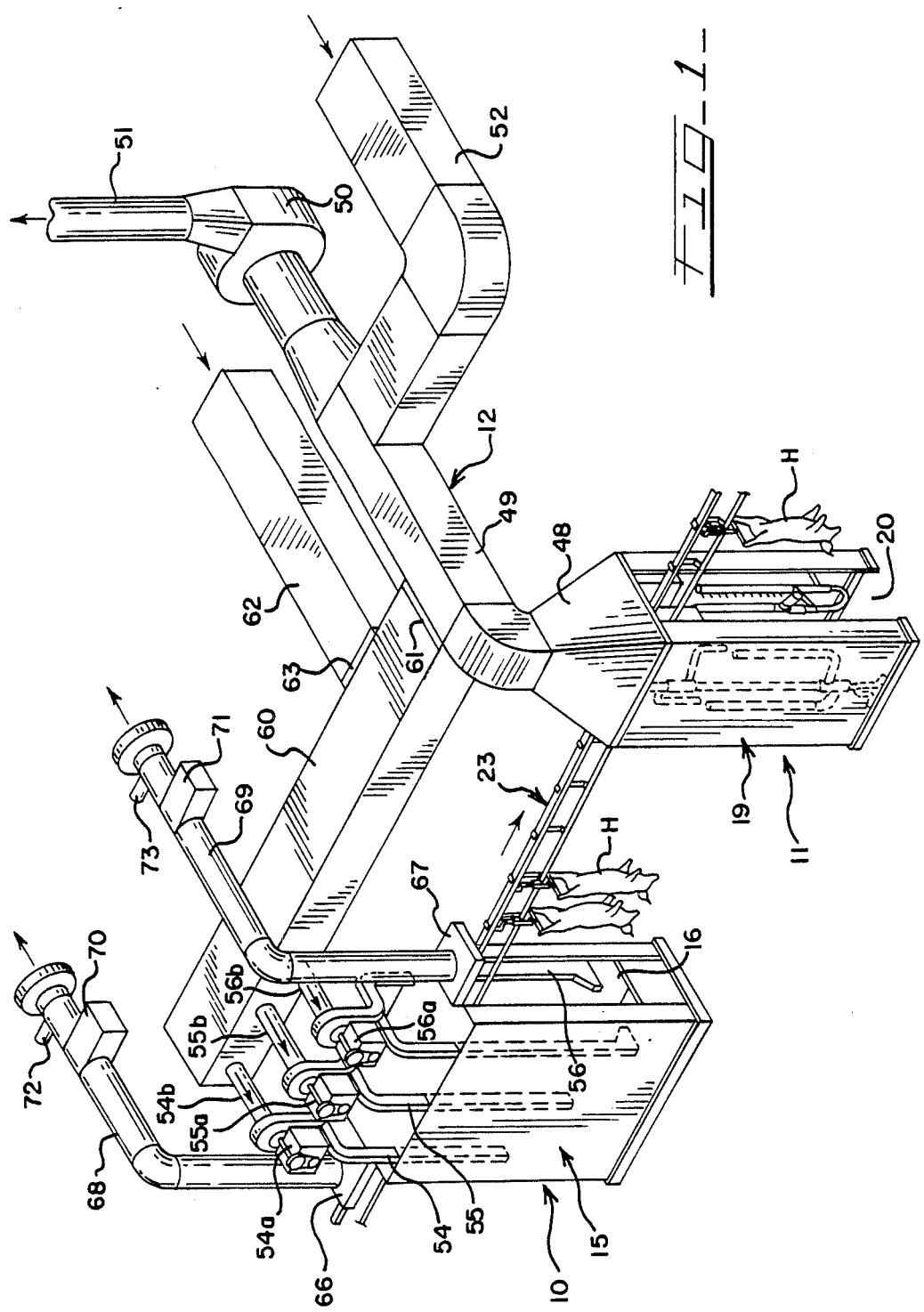

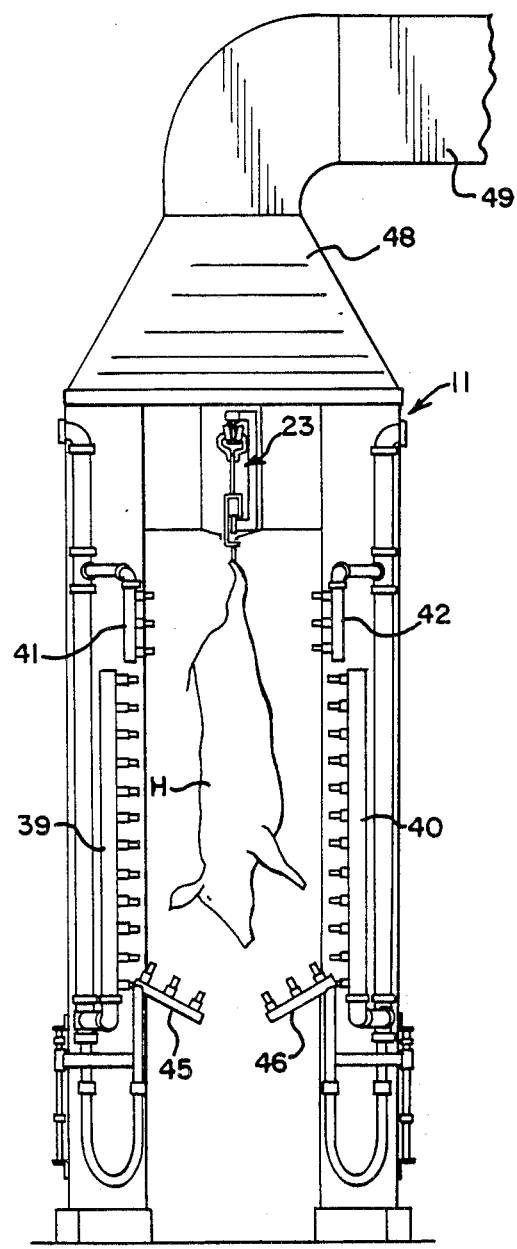
FIG_2_
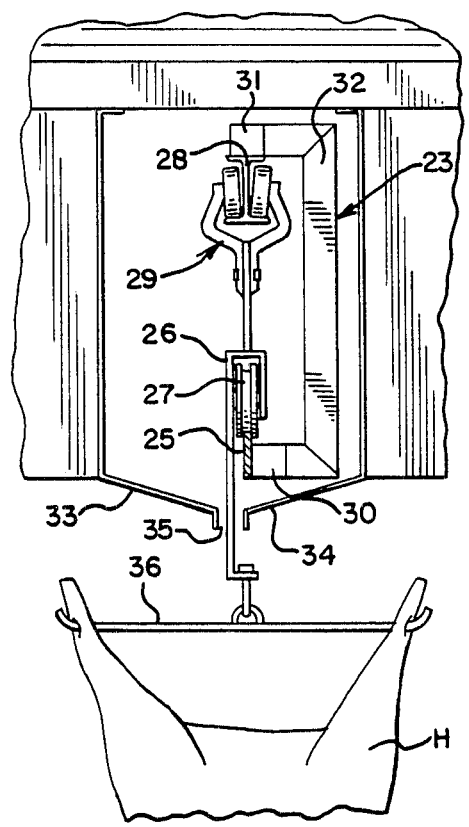
FIG_3_

APPARATUS FOR PROCESSING DEHAIRED HOGS

DESCRIPTION

This invention relates in general to an apparatus for processing dehaired hog carcasses, and more particularly to a combination of a predryer and a singer where the predryer is provided with a heated air supply and the heat energy in the heated air supply is derived solely from the waste flue gases exhausted from the singer.

BACKGROUND OF THE INVENTION

In the slaughtering process for hogs, the hog carcasses are subjected to a dehairing operation which removes substantially all of the hair and leaves the hog skin and remaining hair and the skin wetted with water. Accordingly, moisture is on the skin after the dehairing operation. Heretofore, the dehaired hogs have been next subjected to a singeing operation by traversing the hogs through a conventional singer. Since the singer includes a cabinet having burners for generating flame to flame-treat the hog skin and remove the remainder of the hair, the energy level in the singer must be such that the singeing operation is satisfactory. Because of surface moisture on the hog skin, it is necessary to remove that moisture prior to satisfactorily completing the singeing operation. Thus, the moisture must be first evaporated. This generates water vapor at the skin and insulates the hair at the surface from exposure to the flame. Accordingly, the energy level must be such to first evaporate the moisture before the hair can be singed by the flame. Sometimes, because of the moisture, the singeing operation is not satisfactory.

SUMMARY OF THE INVENTION

The present invention eliminates the necessity to evaporate the moisture at the skin in the singeing cabinet, thereby reducing the amount of fuel used in the singe cabinet and conserving on energy usage. The present invention includes in combination with the singer a predryer cabinet through which the hog carcasses are first traversed prior to entering the singeing cabinet. Heated air is blown over the hog carcass in the predryer cabinet. The energy for producing the heated air is recovered from the waste flue gases exhausted from the singeing cabinet. An air-to-air heat exchanger removes heat from the exhaust gases and adds it to fresh air flowing through the heat exchanger to provide the heated air for the predryer. Accordingly, the predryer is not dependent upon an independent source of heat for effecting the predrying operation. As the hog carcass is moved through the predryer, the moisture at the hog skin is evaporated by the heated air blown over the carcasses, thereby reducing the amount of energy needed at the singeing cabinet for flame treating the hogs and obtaining a satisfactory singeing operation.

It is therefore an object of the present invention to provide a new and improved apparatus for processing dehaired hogs for removing the remaining hair through a singeing operation.

A further object of the present invention is to provide a predryer in combination with a singer and means for recovering heat from the waste flue gases of the singer for use in adding heat to the predryer air.

A still further object of the invention is to complete the singeing operation with less fuel to conserve energy and to obtain a more satisfactory singeing operation.

Other objects, features and advantages of the invention will be apparent from the following detailed disclosure, taken in conjunction with the accompanying sheets of drawings, wherein like reference numerals refer to like parts, in which:

BRIEF DESCRIPTION OF THE DRAWINGS

FIG. 1 is a diagrammatic view of the apparatus of the present invention which processes dehaired hogs by removing the remainder of the hair through a singeing operation;

FIG. 2 is a greatly enlarged vertical sectional view taken through the hog singer shown in FIG. 1; and FIG. 3 is a fragmentary and greatly enlarged view of the conveyer track along which the hogs are conveyed.

DESCRIPTION OF THE INVENTION

The apparatus of the present invention would be used in the workspace of a hog slaughtering plant and serves to process dehaired hogs to remove by singeing the remainder of the hair on the hog skin that cannot be removed by the initial dehairing operation so that the hog skin is devoid of hair. During the initial dehairing operation, the hog skin of a hog carcass is subjected to wetting by water to assist in washing down the skin. Consequently, as the dehaired hogs move toward the singer, moisture remains on the hog skin that must be rmoved prior to a satisfactory singeing operation. That moisture when removed in a singeing cabinet generates a water vapor that has a tendency to insulate the hairs against the singeing operation. Accordingly, the moisture must first be removed before the singeing operation can be satisfactorily achieved.

The apparatus of the present invention subjects the hog carcasses to a predrying operation through blast heated air which removes the moisture and thereby reduces the energy needed at the singeing cabinet for final singeing and removal of the remainder of the hair. The predryer air is heated solely by heat recovered from the waste flue gases of the singer. The predryer air is initially fresh air drawn across a heat exchanger along one flow path, while the waste flue gases of the singer are drawn through the heat exchanger along another flow path. Thus, these air flows do not mix with one another. Additionally, the air flow from the heat exchanger is controlled as it is discharged into a plenum or mixing chamber. Similarly, fresh air may be introduced into the plenum or mixing chamber at a controlled flow rate so as to produce a desired temperature level for the predryer air. After the predryer air has been blasted over the hog carcass, the hot moist air is then collected and selectively discharged to atmosphere or used for make-up heat in the workspace of the apparatus depending upon the desired air conditions for the workspace.

Referring now to the drawings, and particularly to FIG. 1, the apparatus of the invention includes generally a predryer 10, a singer 11, and a waste heat recovery system 12. The predryer 10 includes an upright predryer cabinet 15 having an inlet (not shown) and an outlet 16. Similarly, the singer includes an upright singer cabinet 19 including an inlet (not shown) and an outlet 20. The inlet and outlet of the predryer cabinet are aligned to provide a straight-through path for the hog carcasses. Similarly, the inlet and the outlet of the singer cabinet are aligned. An overhead conveyer 23 extends through both the predryer cabinet and the singer cabinet and along which hog carcases are conveyed as they move through the cabinets. While the overhead conveyer 23 is illustrated in FIG. 1 as extending straight through both the predryer and the singer, it may be appreciated that depending upon space limitations the singer could be arranged such that the path of movement through the singer is angularly related to the path of movement through the predryer.

The overhead conveyer 23 is of the conventional type which would be water-cooled and includes a track in the form of a rail 25 over which a trolley would run that includes a frame 26 having a flanged roller 27. Directly superimposed over the rail 25 is a supporting I-beam 28 along which a dual roller guide device 29 runs to assure the vertical disposition of the frame 26. The I-beam is suitably connected to and supported by the building in which the conveyer is located. A water conduit 30 is directly associated with the lower rail 25, while a water conduit 31 is directly associated with the I-beam 28 and provided with a plurality of interconnecting conduits 32 so as to provide circulation between the upper and lower conduits and also to provide support from the I-beam to the rail. As also illustrated both in FIGS. 2 and 3, the conveyer is mounted in a protected area of the cabinet at the upper end in order to inhibit the direct impingement of flame onto the track. Between the track panels 33 and 34 a slot 35 is defined and through which extends the frame 26 of the trolley and to which is connected at its lower end a hanger 36 for supporting the hind legs of the hog carcasses H. It is not necessary to provide the exact same shielding arrangement in the predryer as the heat level in the predryer is much lower.

As also seen in FIG. 2, opposed banks of vertically arranged burner nozzles 39 and 40 are arranged to cover most of the hog carcass. At the upper ends slightly inwardly spaced smaller banks of burner nozzles 41 and 42 serve to assure adequate flame treatment on the hind legs of the carcass. At the lower end upwardly projecting inclined banks of burner nozzles 45 and 46 serve to assure the flame treatment of the hog carcass head. Preferably, the burners are gas filled but any other suitable fuel may be used. While the hog carcass shown in FIG. 2 is illustrated as being rotated 90 degrees from the showing of the hog carcasses in FIG. 1, it may be appreciated that the burners in the singer will properly affect the singeing operation no matter what the orientation of the hog carcass is when it is conveyed through the singer.

At the upper end of the singer, a hood 48 collects the waste flue gases from the burners and discharges those gases into an air-to-air heat exchanger 49 of the waste heat recovery system. An induced draft fan 50 is connected to the outlet of the heat exchanger for the flue gas flow to induce the collection of the waste flue gases through the hood 48 and the heat exchanger and discharges the flow through an exhaust pipe 51 that is suitably connected to atmosphere.

It will be appreciated that the heat exchanger 49 is of the conventional type which would include flue gas tubes through which the flue gas would flow and over which the fresh air would flow to pick up heat from the flue gases.

A plurality of air nozzles are provided in the predryer cabinet 15 and mounted in pairs at opposite sides of the cabinet to define therebetween a path along which the hog carcasses are conveyed so that they are subjected to air blasts from both sides. As seen in FIG. 1, air nozzle pairs 54, 55 and 56 are arranged in spaced relation longitudinally along the cabinet between which the hog carcasses are conveyed. Blowers 54a, 55a and 56a are mounted above the cabinet for generating the air flow to the air nozzles. The inlets to the blowers 54b, 55b and 56b respectively are connected to the predryer air mixing or plenum chamber 60. The fresh air outlet of the heat exchanger 49 is connected to the plenum chamber 60 through a damper 61 operable to control the air flow of heated fresh air into the plenum chamber. A fresh air inlet 62 is also connected to the plenum chamber 60 through a damper 63 that controls the flow of fresh air into the plenum chamber. Accordingly, a mixture of heated air and fresh air may be discharged from the plenum chamber 60 depending upon the fittings of the dampers 61 and 63 to provide predryer air at a selected temperature level.

The exhaust air from the predryer cabinet 15 is connected by hoods 66 and 67 disposed respectively over the inlet and outlet of the predryer cabinet. Ducts 68 and 69 respectively connected to the hoods 66 and 67 lead from the hoods and suitably to the atmosphere. Axial fans 70 and 71 are respectively provided for the ducts 68 and 69 to produce the desired air flow for the exhaust hoods 66 and 67. Suitably dampered outlets 72 and 73 are provided for the ducts 68 and 69 to selectively direct the exhaust air from the predryer to the workspace for hot air makeup. Normally, the air flow generated by the exhaust fans 70 and 71 is greater than the air flow induced into the predryer so that a slight negative pressure exists within the predryer. This results in preventing the escape of hot moist air into the surrounding workspace of the cabinet. Optionally, where it is desired to have the hot moist air introduced into the workspace, the air flow generated by the blowers 54a, 55a and 56a would then exceed that generated by the exhaust fans 70 and 71. In that event a positive pressure would exist within the predryer cabinet and at least a part of the exhaust air would then be discharged into the workspace.

In operation, hog carcasses are conveyed first into the predryer 10 and then through the singer 11. Heat is recovered from the waste flue gases of the burners in the singer by the heat exchanger 49 and used by the predryer 10 to evaporate the moisture from the hog skin of the hog carcasses, thereby enhancing the singeing operation and reducing the energy required for driving the burners in the singer. Accordingly, a more efficient process is produced for singeing dehaired hogs.

It will be understood that modifications and variations may be effected without departing from the scope of the novel concepts of the present invention, but it is understood that this application is to be limited only by the scope of the appended claims.

The invention is hereby claimed as follows:

1. Apparatus for processing dehaired hog carcasses comprising:
   a predryer for removing skin moisture,
   a singer for flame treating the skin to remove the remainder of any hair and make the skin devoid of any hair,
   an overhead conveyor for conveying hog carcasses sequentially through the predryer and the singer,
   said predryer including a cabinet and subjecting the hog carcasses to heated predrying air and having air nozzles at opposite sides of the cabinet between which the hog carcasses are conveyed, and blower means for said air nozzles, said singer including a cabinet for subjecting the hog carcasses to flame treatment and having gas fired burners at opposite sides of the cabinet between which the hog carcasses are conveyed, said cabinet further including a hood for collecting the waste flue gases, and an exhaust fan for said hood, said predryer cabinet being spaced upstream from said singer cabinet, both said cabinets having inlets and outlets, whereby hog carcasses move from the outlet of the predryer cabinet and then into the inlet of the singer cabinet, a heat exchanger having a fresh air inlet, means directing said singer exhaust gases through said heat exchanger along one air flow path, means directing fresh air into said fresh air inlet and through said heat exchanger along another air flow path to extract heat from the flue gases, a plenum chamber connected between the heat exchanger and said predryer, a fresh air inlet to said plenum chamber, means controlling the air flow through said plenum chamber fresh air inlet, means controlling the flow of air from the heat exchanger to said plenum chamber, whereby predryer air made in the plenum chamber is discharged to the predryer cabinet.

* * * * *